United States Patent
Briden et al.

(10) Patent No.: US 12,358,216 B2
(45) Date of Patent: Jul. 15, 2025

(54) POROUS SECTIONS WITH PARTIALLY-FUSED BUILD MATERIAL PARTICLES

(71) Applicant: Peridot Print LLC, Palo Alto, CA (US)

(72) Inventors: John Joseph Briden, Palo Alto, CA (US); Javier Ledesma Fernandez, Sant Cugat del Valles (ES)

(73) Assignee: Peridot Print LLC, Palo Alo, CA (US)

( * ) Notice: Subject to any disclaimer, the term of this patent is extended or adjusted under 35 U.S.C. 154(b) by 95 days.

(21) Appl. No.: 17/909,954

(22) PCT Filed: Mar. 31, 2020

(86) PCT No.: PCT/US2020/026019
§ 371 (c)(1),
(2) Date: Sep. 7, 2022

(87) PCT Pub. No.: WO2021/201850
PCT Pub. Date: Oct. 7, 2021

(65) Prior Publication Data
US 2023/0107827 A1    Apr. 6, 2023

(51) Int. Cl.
*B29C 64/165* (2017.01)
*B29C 33/38* (2006.01)
(Continued)

(52) U.S. Cl.
CPC ........ *B29C 64/165* (2017.08); *B29C 33/3814* (2013.01); *B29C 33/3835* (2013.01);
(Continued)

(58) Field of Classification Search
CPC .................................................... B29C 64/165
See application file for complete search history.

(56) References Cited

U.S. PATENT DOCUMENTS

| 6,365,092 B1 | 4/2002 | Backa et al. |
| 9,278,338 B2 | 3/2016 | Coupland |

(Continued)

FOREIGN PATENT DOCUMENTS

| CN | 109562569 A | 4/2019 | |
| DE | 102018003447 A1 * | 10/2019 | ............ B22F 10/10 |

(Continued)

OTHER PUBLICATIONS

HP Multi Jet Fusion Handbook; Special CGS plus edition. 113 pages. Apr. 2019. Retrieved Sep. 5, 2024 from https://cgsplus.si/wp-content/uploads/2021/11/CGS-HP-Multi-Jet-Fusion-Handbook.pdf. (Year: 2019).*

(Continued)

*Primary Examiner* — Atul P. Khare
(74) *Attorney, Agent, or Firm* — Michael Dryja

(57) ABSTRACT

According to examples, an apparatus may include a plurality of structures formed of fused sections of build material particles and a plurality of porous sections supported by the plurality of structures. The plurality of porous sections may be formed of partially-fused build material particles, in which the partially-fused build material particles may include build material particles that may be partially fused together to cause the plurality of porous sections to have at least a predefined porosity level.

12 Claims, 4 Drawing Sheets

(51) Int. Cl.
    *B29C 51/36*     (2006.01)
    *B29C 64/393*     (2017.01)
    *B33Y 10/00*     (2015.01)
    *B33Y 50/02*     (2015.01)
    *B33Y 80/00*     (2015.01)

(52) U.S. Cl.
    CPC ........ *B29C 33/3842* (2013.01); *B29C 51/365* (2013.01); *B29C 64/393* (2017.08); *B33Y 10/00* (2014.12); *B33Y 50/02* (2014.12); *B33Y 80/00* (2014.12)

(56) References Cited

U.S. PATENT DOCUMENTS

| | | |
|---|---|---|
| 2005/0059757 A1 | 3/2005 | Bredt et al. |
| 2005/0074550 A1 | 4/2005 | Leuterer et al. |
| 2017/0165790 A1 | 6/2017 | McCarthy et al. |
| 2017/0266882 A1 | 9/2017 | Yan et al. |
| 2017/0284206 A1 | 10/2017 | Roberts et al. |
| 2017/0370049 A1 * | 12/2017 | Andersson ............ B22F 3/1109 |
| 2018/0326484 A1 * | 11/2018 | Bonilla Gonzalez .. B33Y 70/00 |
| 2019/0039303 A1 | 2/2019 | Barnes et al. |
| 2019/0047216 A1 | 2/2019 | Emamjomeh et al. |

FOREIGN PATENT DOCUMENTS

| | | | |
|---|---|---|---|
| EP | 3871859 A1 | 9/2021 | |
| EP | 3888888 A1 | 10/2021 | |
| GB | 2456502 A * | 7/2009 | ............... D21J 3/00 |
| JP | 56-080487 A | 7/1981 | |
| RU | 2699139 C2 | 9/2019 | |
| RU | 2707307 C1 | 11/2019 | |
| WO | 2018/199993 A1 | 11/2018 | |
| WO | 2018/231825 A1 | 12/2018 | |
| WO | WO-2018237279 A1 * | 12/2018 | ............... D21J 3/00 |
| WO | 2019/066659 A2 | 4/2019 | |
| WO | 2019/194837 A1 | 10/2019 | |
| WO | 2019/245589 A1 | 12/2019 | |

OTHER PUBLICATIONS

Dommati, H., et al., "A comprehensive review of recent developments in 3D printing technique for ceramic membrane fabrication for water purification", RSC Advances, vol. 9, No. 29, May 29, 2019, pp. 16869-16883.

* cited by examiner

POROUS SECTIONS WITH PARTIALLY-FUSED BUILD MATERIAL PARTICLES

BACKGROUND

In three-dimensional (3D) printing, an additive printing process may be used to make 3D solid parts from a digital model. Some 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat, a chemical binder, and/or an ultra-violet or a heat curable binder.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
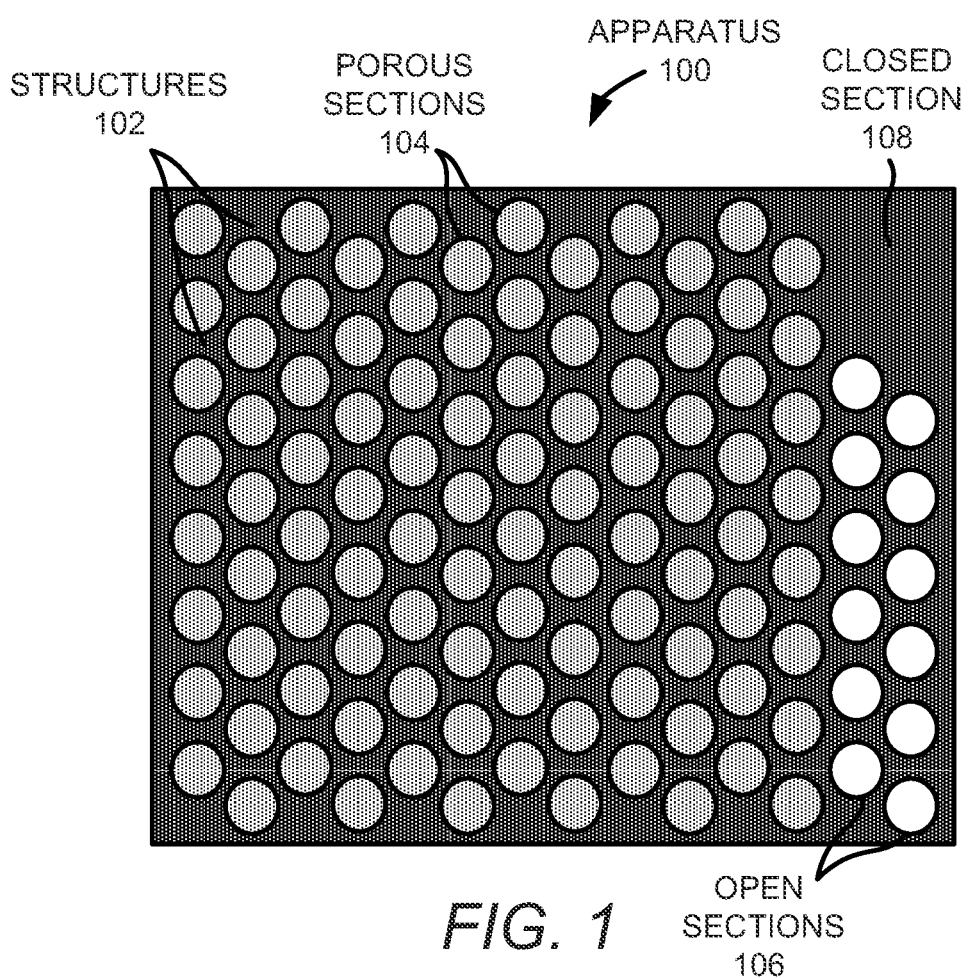
FIG. 1 shows a block diagram of an example apparatus that may include a plurality of porous sections formed of partially-fused build material particles.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Screen apparatuses having pores may be employed to filter particles from a fluid, for instance, as vacuum pressure is applied on the fluid to force the fluid to flow through the pores. Some of the particles may, however, flow through screen apparatuses having pores with dimensions that are larger than the solid particles. To prevent the flow of the solid particles through the screen apparatuses, the pores in the screen apparatuses may be fabricated to have widths or diameters that are smaller than the particles that the screen apparatuses are to filter. However, current fabrication techniques, such as current three-dimensional (3D) fabrication techniques, may be limited as to the minimum dimensions to which the pores may be formed, which may limit the use of the screen apparatuses to filtering particles of at most a certain minimum size corresponding to the sizes of the pores.

Disclosed herein are apparatuses, e.g., screen apparatuses, that may be fabricated to have pores having dimensions, e.g., widths or diameters, that may be significantly smaller than may be achievable through current fabrication techniques. Also disclosed herein are 3D fabrication systems and methods that may be employed to fabricate the apparatuses to have the significantly smaller pore dimensions. Particularly, the 3D fabrication systems and methods disclosed herein may fabricate the apparatuses to include a plurality of structures formed of fused build material particles and a plurality of porous sections formed of partially-fused build material particles. The partially-fused build material particles may be formed of build material particles that are partially fused together to cause the plurality of porous sections to include pores (or equivalently, voids, channels, and/or the like) that are significantly smaller than may be achievable through current fabrication techniques, in which the pores may enable fluid to flow through the porous sections. In some examples, the build material particles may have micron-sized dimensions and partial fusing of the build material particles, e.g., fusing some but not all of the build material particles in the porous sections, may result in the pores in the porous sections having micron level or sub-micron level sizes. That is, the pores may have sizes that are less than about 100 microns and in some examples, less than about 50 microns, and in other examples, less than around 10 microns. The apparatuses disclosed herein may thus filter solid particles having significantly smaller sizes than may be achievable with screen apparatuses fabricated using current techniques.

The 3D fabrication systems may fabricate the apparatuses such that the pores may have at least a predefined porosity level. The predefined porosity level may include a predefined range of sizes at which the pores in the porous sections are to be fabricated, a predefined rate at which a fluid is to flow through the pores in the porous sections when a certain amount of vacuum pressure is applied on the fluid through the apparatus, a predefined diameter or width of the porous sections to achieve the predefined rate while maintaining a certain level of structural stability, a predefined size at which the pores are to be fabricated to achieve the predefined rate, and/or the like.

As discussed herein, and according to some examples, the 3D fabrication systems may form the porous sections to have the predefined porosity level by preventing the build material particles in the porous sections from fully fusing with each other. The build material particles in the porous sections may be considered as being partially fused (or equivalently, not fully fused) when, for instance, less than all of the build material particles in the porous sections reach their melting point temperature, melt, and fuse with all of their neighboring particles. As another example, the build material particles in the porous sections may be considered as being partially fused when, for instance, a certain percentage of the build material particles in the porous sections reach (or fail to reach) a melting state and thus fuse (or fail to fuse) with all of their neighboring particles.

In some examples, the 3D fabrication systems may prevent the build material particles from fully fusing together by depositing a controlled pattern of a detailing agent onto the build material particles in the porous sections. The detailing agent may reduce the fusing of the build material particles by, for instance, preventing some of the build material particles in the porous sections from reaching their melting point temperatures. In some examples, the 3D fabrication systems may additionally or alternatively deposit a controlled pattern of fusing agent onto those build material particles while in other examples, the fusing agent may not be applied onto those build material particles. In any of these examples, the patterns of detailing agent and/or fusing agent applied to the build material particles in the porous sections may be tuned to result in the predefined porosity level.

In addition or in other examples, the 3D fabrication systems may cause the build material particles in the porous sections to be partially fused together through control of residual energy or heat applied to those build material particles. That is, for instance, the 3D fabrication systems may cause build material particles in the structures around peripheries of the porous sections to be heated to a melting point temperature of the build material particles and residual heat (or equivalently, thermal bleed) from the heating of the build material particles in the structures may cause the build material particles in the porous sections to partially fuse together. The 3D fabrication systems may cause the build material particles in the structures to be heated to their melting point temperature through deposition of selected patterns of a fusing agent onto the build material particles in the structures and subsequently applying energy to heat the build material particles. Alternatively, the 3D fabrication systems may cause energy to be selectively applied to the build material particles in the structures without causing energy to be applied to the build material particles in the porous sections.

According to examples, the apparatuses disclosed herein may be employed as screens, filters, or the like. In a particular example, the apparatuses may be employed as a pulp molding die. In this regard, the apparatuses may be used to form a product from a pulp of material. In addition, the porous sections of the apparatuses may have sufficiently small porosity levels to enable the porous sections to filter fluid from a pulp having relatively small fiber sizes while limiting or preventing the fiber from flowing into and through the porous sections. Moreover, the small porosity levels may reduce or prevent imprinting of the porous sections onto a molded fiber part, may enable the porosities of pore sections located in various areas of the apparatus to differ from each other, and/or the like.

Figure 2:
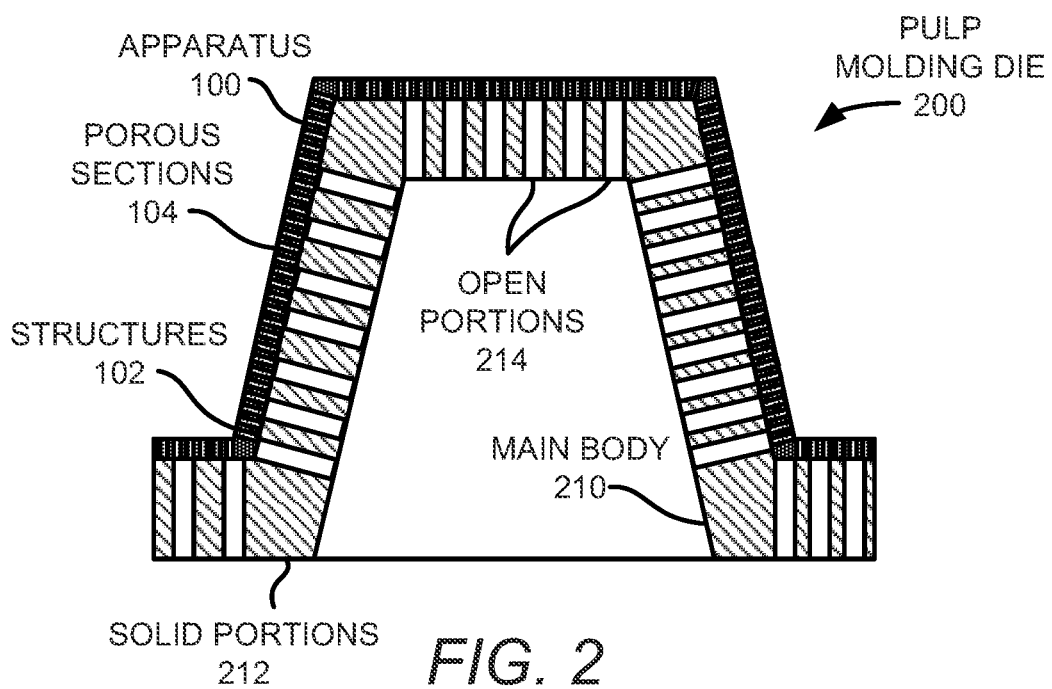
FIG. 2 shows a cross-sectional side view of an example pulp molding die in which the example apparatus depicted in FIG. 1 may be implemented.

Reference is first made to FIGS. 1 and 2. FIG. 1 shows a block diagram of an example apparatus 100 that may include a plurality of porous sections formed of partially-fused build material particles. FIG. 2 shows a cross-sectional side view of an example pulp molding die 200 in which the example apparatus 100 depicted in FIG. 1 may be implemented. It should be understood that the example apparatus 100 depicted in FIG. 1 and/or the example pulp molding die 200 may include additional features and that some of the features described herein may be removed and/or modified without departing from the scopes of the apparatus 100 and/or the pulp molding die 200.

Generally speaking, the apparatus 100 may be a screen or other type of device that may be employed to filter particles from a fluid. For instance, the apparatus 100 may be a screen (or equivalently, a screen apparatus) that may be employed to separate a fibrous material from a pulp or slurry, in which the fibrous material may be immersed in a fluid, which may be a liquid such as water. By way of particular example, the apparatus 100 may be employed as a screen for a main body 210 of the pulp molding die 200. Thus, although the apparatus 100 is depicted in FIG. 1 as having a relatively simple configuration, the apparatus 100 may have a relatively complex configuration that may match the configuration of the main body 220, for instance, as shown in FIG. 2. In other examples, the apparatus 100 may filter particles from a gas.

As shown in FIG. 1, the apparatus 100 may include a plurality of structures 102 and a plurality of porous sections 104. The porous sections 104 may be formed between the structures 102 such that the structures 102 may support the porous sections 104, e.g., the porous sections 104 may be attached to, e.g., fused with, the structures 102. The structures 102 may be formed of build material particles that have been fused together such that, for instance, the structures 102 have solid cross-sections. In other words, the structures 102 may be mostly or entirely non-porous structures and may thus prevent fluid flow through the structures 102 while providing structural support for the porous sections 104.

The porous sections 104 may be formed of partially-fused build material particles. The partially-fused build material particles may include, or equivalently, may be formed of, build material particles that may have been partially fused together to cause the porous sections 104 to have at least a predefined porosity level. The predefined porosity level may be a porosity level that may permit a fluid, e.g., water, or other liquid and/or gas to pass through the porous sections 104, while preventing or blocking solid particles (e.g., pulp fibers) from flowing through the porous sections 104 when a vacuum pressure is applied. Thus, for instance, the predefined porosity level may be based upon the type of material that the apparatus 100 is to filter. In other words, the predefined porosity level may be larger for apparatuses that are to filter larger materials while the predefined porosity level may be smaller for apparatuses that are to filter smaller materials. In some examples, the predefined porosity levels for various ones of the porous sections 104 may differ among each other.

According to examples, the predefined porosity level may include a predefined range of sizes at which the pores in the porous sections 104 are to be fabricated, a predefined rate at which a fluid is to flow through the pores in the porous sections 104 when a certain amount of vacuum pressure is applied on the fluid through the apparatus 100, a predefined diameter or width of the porous sections 104 to achieve the predefined rate while maintaining a certain level of structural stability, a minimum or maximum predefined size at which the pores are to be fabricated to achieve the predefined rate while preventing particles of certain sizes from passing through the pores when a vacuum pressure is applied on the fluid through the apparatus 100, and/or the like.

The porosity level may also be below a predefined maximum porosity level (e.g., a second predefined porosity level), in which the predefined maximum porosity level may correspond to a porosity level that may result in the fluid being unable to flow through the porous sections 104 below a predefined flow rate. That is, for instance, the porosity level may correspond to a minimum pore size that enables the predefined flow rate to be achievable. The predefined flow rate may be a flow rate that may result in the particles (e.g., fibers) taking longer than an intended time frame to take a particular shape defined by the apparatus 100. In any regard, the porous sections 104 may have porosity levels that may be relatively smaller than may be achievable through formation of pores having no fused build material particles. By way of example, the pores formed in the porous sections 104 may have micron or sub-micron level sizes. In addition, the pores in the porous sections 104 may be randomly formed such that for instance, the pores may form non-linearly through the porous sections 104.

As described herein, the structures 102 may be formed of mostly or entirely fused build material particles and the porous sections 104 may be formed of partially-fused build material particles. In this regard, the build material particles forming the structures 102 may be fused together to cause the structures 102 to have a predefined structural property that is greater than a structural property of the porous sections. That is, for instance the structures 102 may withstand larger loads than the porous sections 104 prior to breaking, fracturing, or the like.

As shown in FIG. 1, the porous sections 104 may have circular shapes, which may result in the apparatus 100 having a relatively high level of strength as the circular shapes do not include sharp corner stress risers. In these examples, the porous sections 104 may have diameters of between around 0.2 millimeters to around 1 millimeter. In other examples, however, the porous sections 104 may have other shapes and/or sizes such as rectangular, hexagonal, triangular, oval, or the like. In addition, some of the porous sections 104 may have different shapes and/or sizes with respect to each other.

As shown in FIG. 2, the main body 210 may include solid portions 212 and open portions 214. The main body 210 may be formed of a substantially rigid material, such as a metal, a plastic, a ceramic, and/or the like. In addition, the open portions 214 may be formed between the solid portions 212 through any suitable fabrication technique. For instance, the open portions 214, which may also be referenced herein as openings, pores, through holes, or the like, may be formed through drilling, through use of a mold, and/or the like. In other examples, the main body 210 may be formed through implementation of a 3D fabrication technique. In particular, for instance, the main body 210 may be fabricated concurrently with the apparatus 100 during a 3D fabrication operation. In any of these examples, the open portions 214 may extend from one side of the main body 210 to an opposite side of the main body 210.

According to examples, and as shown in FIG. 2, the open portions 214 may have circular cross-sections that may be relatively larger in diameter than the porous sections 104. In other examples, the open portions 214 may have other cross-sectional shapes, e.g., rectangular, hexagonal, triangular, oval, or the like, that may be relatively larger in width than the porous sections 104. In operation, a vacuum pressure may be applied from a side of the main body 210 opposite the apparatus 100 when the pulp molding die 200 is immersed in a pulp or slurry containing a material. As fluid in the pulp or slurry flows through the porous sections 104 in the apparatus 100 and the open portions 214 in the main body 210, the material in the pulp or slurry may be compressed onto the apparatus 100 and may take the shape of the apparatus 100.

Figure 3:
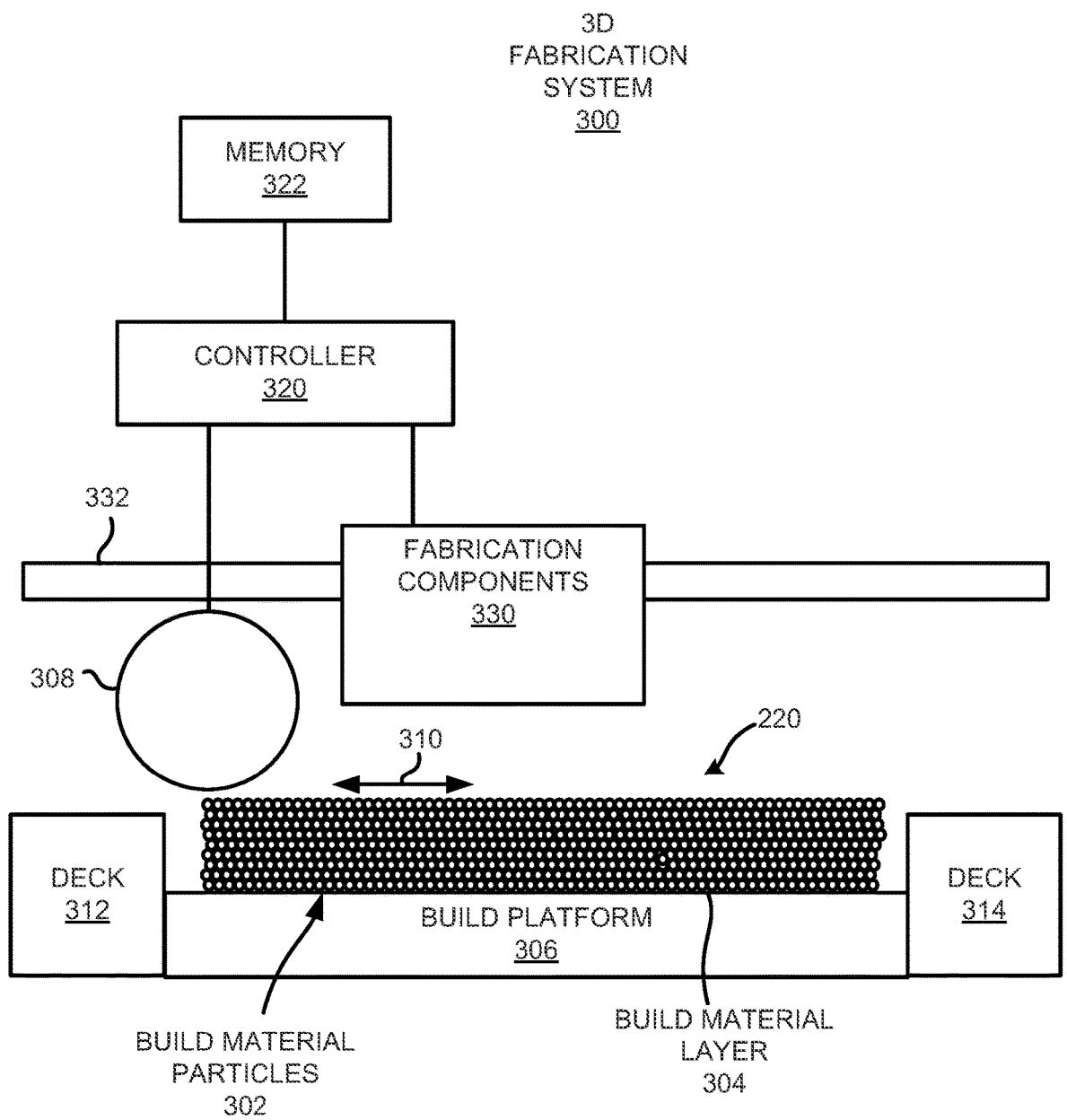
FIG. 3 shows an example 3D fabrication system that may be employed to fabricate the apparatus depicted in FIGS. 1 and 2.

According to examples, the apparatus 100 may be fabricated through implementation of a three-dimensional (3D) fabrication process. Turning now to FIG. 3, there is shown an example 3D fabrication system 300 that may be employed to fabricate the apparatus 100 depicted in FIGS. 1 and 2. The 3D fabrication system 300 may also be termed a 3D printing system, a 3D fabricator, or the like, and may be implemented to fabricate 3D objects through selective binding and/or solidifying of build material particles 302 together. The build material particles 302 may be formed into a build material layer 304 on a build platform 306 during fabrication of the apparatus 100. It should be understood that the example 3D fabrication system 300 depicted in FIG. 3 may include additional features and that some of the features described herein may be removed and/or modified without departing from the scope of the 3D fabrication system 300.

The build material particles 302 may include any suitable material for use in forming 3D objects. The build material particles 302 may include, for instance, a polymer, a plastic, a nylon, a metal, combinations thereof, or the like, and may be in the form of a powder or a powder-like material. Additionally, the build material particles 302 may have dimensions, e.g., widths, diameters, or the like, that are generally between about 5 μm and about 100 μm. In other examples, the build material particles 302 may have dimensions that are generally between about 30 μm and about 60 μm. The build material particles 302 may have any of multiple shapes, for instance, as a result of larger particles being ground into smaller particles. In some examples, the build material particles 302 may be formed from, or may include, short fibers that may, for example, have been cut into short lengths from long strands or threads of material. In addition, or in other examples, the particles may be partially transparent or opaque. According to one example, a suitable build material may be PA11 and/or PA12 build material available from HP Inc.

As shown, the 3D fabrication system 300 may include a recoater 308, which may spread, spray, or otherwise form the build material particles 302 into a build material layer 304. By way of example, the recoater 308 may be a roller, a spreader, or the like, that may spread the build material particles 302 into the build material layer 304 as the recoater 308 is moved, e.g., scanned, across the build platform 306 as indicated by the arrow 310. As another example, the recoater 308 may include a sprayer, or the like, that may sprinkle the build material particles 302 to form the build material layer 304 as the recoater 308 is moved across the build platform 306 as indicated by the arrow 310. According to examples, the build platform 306 may provide a build area for the build material particles 302 to be spread into successive layers 304 of build material particles 302. The build platform 306 may be movable in a direction away from the recoater 308 during formation of successive build material layers 304.

According to examples, the 3D fabrication system 300 may include a deck 312 from which build material particles 302 may be supplied for formation into build material layers 304. For instance, the deck 312 may supply an amount of build material particles 302 on top of the deck 312 that the recoater 308 may push over the build platform 306 as the recoater 308 is moved across the build platform 306 as denoted by the arrow 310 to form a build material layer 304 on the build platform 306 or on a previously formed build material layer 304. In some examples, the 3D fabrication system 300 may include another deck 314 from which build material particles 302 may be supplied for formation into build material layers 304. The 3D fabrication system 300 may include the decks 312, 314 to enable build material layers 304 to be formed as the recoater 308 is moved in either or both of the directions denoted by the arrow 310. In other examples, however, the build material particles 302 may be sprayed or otherwise deposited onto or over the build platform 306.

As shown, a controller 320 may control operations of the recoater 308. The controller 320 may be a computing system such as a server, a laptop computer, a tablet computer, a desktop computer, or the like. In other examples, the controller 320 may be a semiconductor-based microprocessor, a central processing unit (CPU), an application specific integrated circuit (ASIC), a field-programmable gate array (FPGA), and/or other suitable hardware device. In any of these examples, the controller 320 may control operations of the recoater 308 to, for instance, cause the build material layer 304 and/or another build material layer that may be formed subsequently to the build material layer 304, e.g., on top of or above the build material layer 304. In any regard, the controller 320 may be part of the 3D fabrication system 300 or may be separate from the 3D fabrication system 300.

The controller 320 may store instructions and/or other data on a memory 322. The memory 322 may be an electronic, magnetic, optical, or other physical storage device that contains or stores executable instructions. The memory 322 may be, for example, Random Access memory (RAM), an Electrically Erasable Programmable Read-Only Memory (EEPROM), a storage device, an optical disc, and the like. Particularly, for instance, the memory 322 may have stored thereon instructions that the controller 320 may execute in controlling the recoater 308. The memory 322 may also have stored thereon instructions that the controller 320 may execute in controlling other components of the 3D fabrication system 300. For instance, the 3D fabrication system 300 may include fabrication components 330 and the memory 322 may have instructions that the controller 320 may execute to control the fabrication components 330. Particularly, the controller 320 may control the fabrication components 330 to cause the build material particles 302 at selected locations of the build material layer 304 to be bound and/or fused together to form a part of a 3D object in the build material layer 304. For instance, the controller 320 may control the fabrication components 330 to fabricate the apparatus 100 to include the structures 102 and the porous sections 104 as discussed herein.

The fabrication components 330 may include an agent delivery device that the controller 320 may control to selectively deliver an agent onto the build material layer 304. For instance, the controller 320 may control the agent delivery device to deliver a fusing agent onto the selected locations, e.g., according to a pattern, of the build material layer 304 that are to be bound/fused together to form the structures 102. The controller 320 may also, in some examples, control the agent delivery device to deliver the fusing agent onto other selected locations of the build material layer 304 that are to be partially fused together to form the porous sections 104, e.g., according to a pattern. By way of particular example, the agent delivery device may be a printhead having a plurality of nozzles in which droplet ejectors, e.g., resistors, piezoelectric actuators, and/or the like, may be provided to eject droplets of an agent through the nozzles.

According to examples, the agent may be a fusing agent to selectively bind and/or solidify the build material particles 302 on which the agent has been deposited. In particular examples, the agent may be a fusing agent that may increase the absorption of energy to cause the build material particles 302 upon which the agent has been deposited to melt and become fused during cooling and solidification.

According to one example, a suitable fusing agent may be an ink-type formulation including carbon black, such as, for example, the fusing agent formulation commercially known as V1Q60A "HP fusing agent" available from HP Inc. In one example, such a fusing agent may additionally include an infra-red light absorber. In one example such fusing agent may additionally include a near infra-red light absorber. In one example, such a fusing agent may additionally include a visible light absorber. In one example, such a fusing agent may additionally include a UV light absorber. Examples of fusing agents including visible light enhancers are dye based colored ink and pigment based colored ink, such as inks commercially known as CE039A and CE042A available from HP Inc.

The fabrication components 330 may also include another agent delivery device that the controller 320 may control to selectively deliver another type of agent onto the build material layer 304. The other type of agent may be a detailing agent, which may inhibit or prevent fusing of build material particles 302 upon which the detailing agent has been deposited, for example by modifying the effect of a fusing agent, by cooling the build material particles 302 upon which the detailing agent has been deposited, or the like. According to one example, a suitable detailing agent may be a formulation commercially known as V1Q61A "HP detailing agent" available from HP Inc.

By way of example, the controller 320 may control the other agent delivery device to selectively deposit the detailing agent onto areas of the build material layer 304 that are not to be fused to form part of the apparatus 100. For instance, the controller 320 may control the other agent delivery device to deposit the detailing agent onto areas of the layer 304 adjacent the areas that are to be fused together to form the structures 102 of the apparatus 100. In addition, the controller 320 may control the other agent delivery device to deposit the detailing agent onto the build material particles 302 positioned in areas of the layer 304 that are to be partially fused to form the porous sections 104 of the apparatus 100. In this regard, the controller 320 may control the pattern at which the detailing agent may be applied to reduce or otherwise control the amount of thermal bleed or equivalently, residual heat applied to the build material particles 302 in areas that are to form the porous sections 104. That is, the controller 320 may control the patterns at which a fusing agent and a detailing agent are deposited onto selected locations of the layer 304 to form the structures 102 and the porous sections 104 as described herein.

The fabrication components 330 may also include an energy source that may apply energy, e.g., warming energy, fusing energy, etc., onto the build material layer 304, for instance, to warm the build material particles 302 in the build material layer 304 to an intended temperature. The energy source may output energy, e.g., in the form of light and/or heat and may be supported on a carriage, which may be movable across the build platform 306. As such, for instance, the energy source may output energy onto the build material layer 304 as the carriage is moved across the build platform 306 to cause the build material particles 302 upon which the fusing agent has been deposited to melt and subsequently fuse together.

In some instances, the build material particles 302 upon which the fusing agent has been deposited may become heated to a level at or beyond the melting point temperature of the build material particles 302 when the energy is applied onto those build material particles 302. As the build material particles 302 are heated, heat from those build material particles 302 may be transferred to other build material particles 302 adjacent to those heated build material particles 302. For instance, the build material particles 302 that are located in the areas that are to form the porous sections 104 upon which the fusing agent may not have been deposited may become heated from the residual heat. As a result, and in instances in which the porous sections 104 have relatively small diameters or widths, the residual heat may cause most or all of the build material particles 302 located in the areas that are to form the porous sections 104 to reach their melting point temperature. Most or all of the build material particles 302 that are to form the porous sections 104 may thus melt and solidify due to the residual heat in instances in which the porous sections 104 are to have relatively small diameters or widths.

To prevent the solidification of the build material particles 302 that are to form the porous sections 104, the controller 320 may control the other agent delivery device to deposit a predefined pattern of the detailing agent on those build material particles 302. The predefined pattern of the detailing agent may be a pattern, e.g., an average density of the applied detailing agent, that may cause those build material particles 302 to partially fuse together such that the porous sections 104 may have the intended porosity levels. The predefined pattern of detailing agent that may result in the porous sections 104 having the intended porosity levels may be determined through testing, modeling, historical data, and/or the like, and may depend on the types of materials being used.

In some examples, instead of a detailing agent being deposited onto the build material particles 302 that are to form the porous sections 104, the build material particles 302 that are to form the porous sections 104 may be partially fused through implementation of other techniques. For instance, the controller 320 may control the fabrication components 330 to deposit fusing agent onto the build material particles 302 at a particular pattern, e.g., to cause the fusing agent to be deposited at a certain average density, that are to form the porous sections 104. In these examples, the residual heat from the build material particles 302 that are to form the structures 102 may be insufficient to cause the build material particles 302 that are to form the porous sections 104 to be partially fused at a level that results in the porous sections 104 having the predefined porosity level. The predefined pattern of fusing agent that may be deposited onto the build material particles 302 that are to form the porous sections 104 may be determined through testing, modeling, historical data, and/or the like, and may depend on the types of materials being used. The amount of fusing agent that may be deposited onto the build material particles 302 that are to form the porous sections 104 may be tuned to the amount of residual heat predicted or known to be available from the neighboring build material particles 302 during heating of those build material particles 302 to form the structures 102.

In other examples, instead of the agent delivery device(s), the fabrication components 330 may include a laser source and the controller 320 may control the laser source to heat the build material particles 302 to form the structures 102. In these examples, residual heat from heating the build material particles 302 to form the structures 102 with the laser source may cause the build material particles 302 in the porous sections 104 to be partially fused. In these examples, the sizes of the porous sections 104 may be tuned the amount of residual heat predicted or known to be available from the neighboring build material particles 302 during heating of those build material particles 302 to form the structures 102.

According to examples, the controller 320 may control movement of the fabrication components 330. That is, for instance, the controller 320 may control actuators, motors, or the like, that may control movement of the fabrication components 330 across the build platform 306. As shown, the 3D fabrication system 300 may include a mechanism 332 along which the fabrication components 330, e.g., a carriage on which the fabrication components 330 may be supported, may move across the build platform 306. The mechanism 332 may be any suitable mechanism by which and/or which may cause the carriage to be moved. For instance, the mechanism 332 may include an actuator, a belt, and/or the like that may cause the carriage to be moved.

Figure 4:
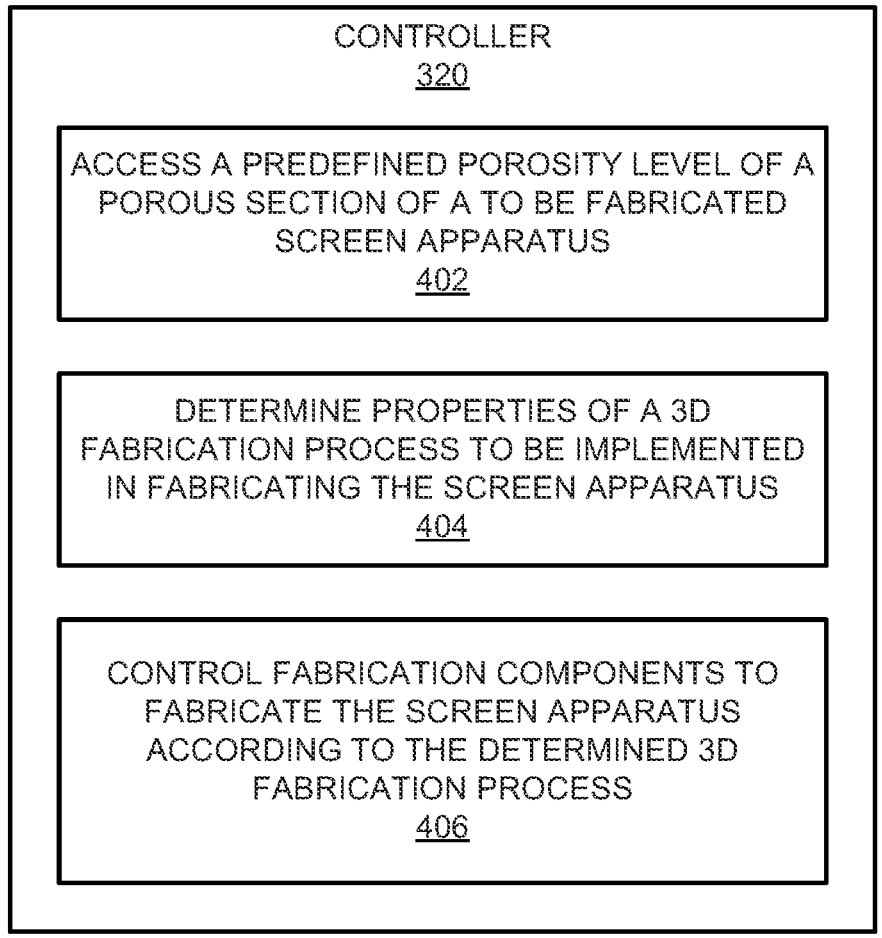
FIG. 4 shows the example controller depicted in FIG. 3.

Reference is now made to FIG. 4, which depicts a block diagram of the example controller 320 depicted in FIG. 3. As shown, the controller 320 may execute instructions 402-406 to cause an apparatus 100 having porous sections 104 formed of partially-fused build material particles 302 to be fabricated. The controller 320 may be programmed to execute the instructions 402-406, e.g., the instructions 402-406 may be programmed into hardware components of the controller 320. In other examples, the controller 320 may communicate with the memory 322 (FIG. 3) that may have stored thereon machine-readable instructions (which may also be termed computer-readable instructions) that the controller 320 may execute. The memory 322, which may also be referred to as a computer readable storage medium, may be a non-transitory machine-readable storage medium, where the term "non-transitory" does not encompass transitory propagating signals.

The controller 320 may access 402 a predefined porosity level at which a porous section 104 of a to be fabricated screen apparatus 100 is to be fabricated. A user may input the predefined porosity level to the controller 320 and/or the controller 320 may access the predefined porosity level from another source. In any regard, the predefined porosity level may be based on a level at which a fluid is to flow through the screen apparatus 100, a minimum size of the material to be filtered by the apparatus 100, and/or the like. In some examples, the predefined porosity level may be indicated in a digital model of the apparatus 100. In these examples, the controller 320 may determine how the fabrication components 330 are to be operated to fabricate the apparatus 100 to have the porous sections 104 having the predefined porosity level.

The controller 320 may determine 404 properties of a three-dimensional (3D) fabrication process to be implemented in fabricating the screen apparatus 100 with the porous section 104 formed of partially-fused build material particles 302. As discussed herein, the partially-fused build material particles 302 may include build material particles 302 that are partially fused together during the 3D fabrication process to cause the porous section 104 to have at least the predefined porosity level. That is, for instance, the controller 320 may determine patterns at which a fusing agent and, in some examples, a detailing agent, are to respectively be applied onto multiple areas of layers 304 of build material particles 302 to form the porous section 104 to have at least the predefined porosity level.

By way of example, the controller 320 may determine that a certain pattern of the fusing agent is to be deposited onto the build material particles 302 positioned in an area that is to be formed into the porous section 104. In some instances, and as discussed herein, the controller 320 may determine that no fusing agent is to be deposited onto build material particles 302 in the area that is to be formed into the porous section 104. In some instances, the controller 320 may determine that a certain pattern of the detailing agent is to be deposited onto those build material particles 302. For instance, the controller 320 may determine that a certain pattern of the detailing agent is to be deposited for higher predefined porosity levels and that another certain pattern of the detailing agent is to be deposited for lower predefined porosity levels. The controller 320 may determine the patterns at which either or both of the fusing agent and the detailing agent are to be deposited onto the build material particles 302 positioned in the area that is to be formed into the porous section 104 based on historical data, modeling, testing, and/or the like. The controller 320 may also determine the patterns at which the fusing agent is to be deposited onto the build material particles 302 positioned in the areas that are to be formed into the structures 102 based on historical data, modeling, testing, and/or the like. In any of these examples, the controller 320 may make the fusing agent and/or detailing agent deposition patterns based on the type of the build material particles 302, the type of the fusing agent, the type of the detailing agent, the dimensions of the structures 102, the dimensions of the porous section 104, the predefined porosity level of the porous section 104, and/or the like.

The controller 320 may control 406 fabrication components 330 to fabricate the screen apparatus 100 according to the determined 3D fabrication process. That is, the controller 320 may control agent delivery devices to deliver the fusing agent and the detailing agent at the determined patterns to form the screen apparatus 100 to have the porous section 104 having at least the predefined porosity level.

Figure 5:
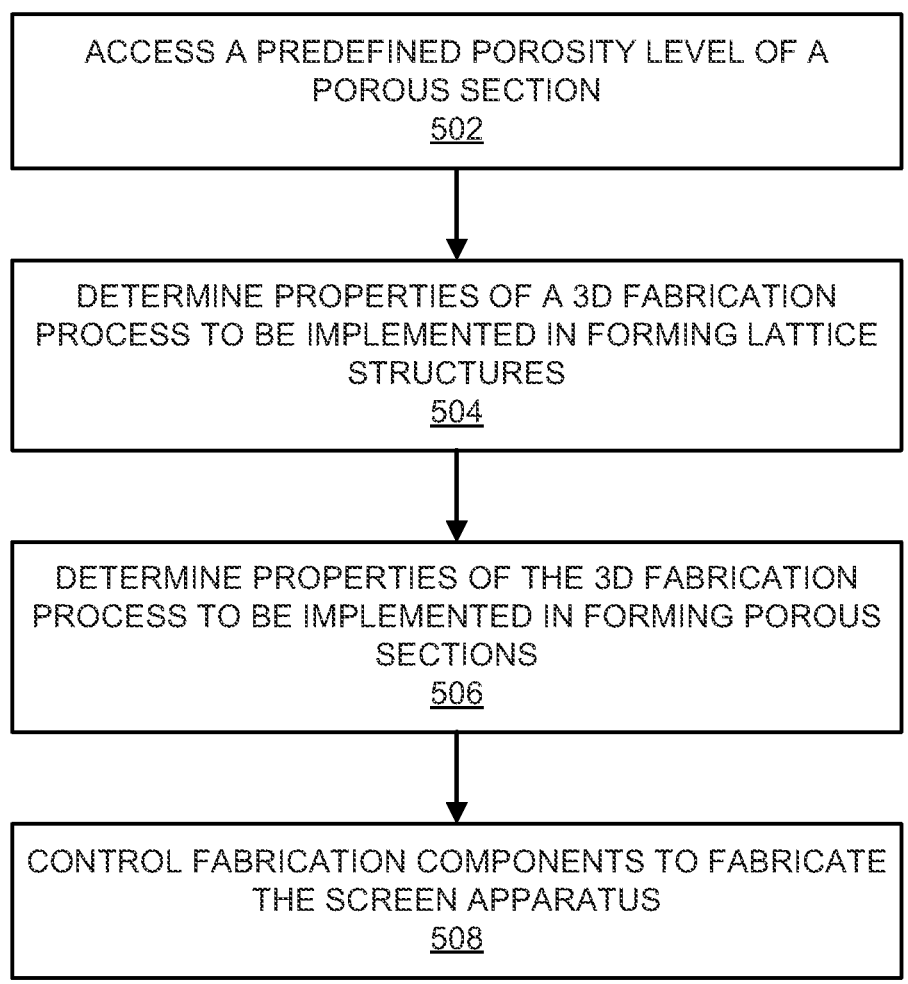
FIG. 5 shows a flow diagram of an example method for controlling fabrication components to fabricate a screen apparatus having a porous section formed of partially-fused build material particles.

Turning now to FIG. 5, there is shown a flow diagram of an example method 500 for controlling fabrication components to fabricate a screen apparatus 100 having a porous section 104 formed of partially-fused build material particles 302. It should be understood that the method 500 depicted in FIG. 5 may include additional operations and that some of the operations described therein may be removed and/or modified without departing from the scope of the method 500. The description of the method 500 is also made with reference to the features depicted in FIGS. 1-4 for purposes of illustration.

At block 502, the controller 320 may access a predefined porosity level of a porous section 104 of a to be fabricated screen apparatus 100. At block 504, the controller 320 may determine properties of a 3D fabrication process to be implemented in forming structures 102 of the screen apparatus 100. For instance, the controller 320 may determine locations on multiple build material layers 304 at which a fusing agent is to be deposited to form the structures 102. The controller 320 may also determine locations on the multiple build material layers 304 at which a detailing agent may be deposited to form, for instance, boundaries of the structures 102. Particularly, for instance, the controller 320 may determine patterns at which the fusing agent and/or the detailing agent are to be deposited on the multiple build material layers 304 to form the structures 102.

At block 506, the controller 320 may determine properties of the 3D fabrication process to be implemented in forming a porous section 104 of the apparatus 100. For instance, the controller 320 may determine patterns on multiple build material layers 304 at which a fusing agent is to be deposited to form the porous section 104. The controller 320 may also determine patterns at which the fusing agent is to be deposited. In addition, the controller 320 may determine patterns at which a detailing agent is to be deposited to cause the build material particles 302 forming the porous section 104 to be partially fused. Thus, for instance, the controller 320 may determine the pattern of the detailing agent that is to be applied to prevent the build material particles 302 forming the porous section 104 from fully fusing when energy is applied onto those build material particles 302. The level of partial fusing may correspond to the predefined porosity level of the porous section 104. In addition or alternatively, the controller 320 may determine a pattern of energy to be applied onto the build material particles 302 to form the porous section 104 to have at least the predefined porosity level.

At block 508, the controller 320 may control fabrication components 330 to fabricate the screen apparatus 100 to include the structures 102 and the porous section 104. For instance, the controller 320 may control the fabrication components 330 to deposit the fusing agent and detailing agent according to the properties of the 3D fabrication process determined at blocks 504 and 506. The controller 320 may also control the fabrication components 330 to apply energy onto the build material layers 304 to cause the build material particles 302 forming the structures 102 to be fused together and the build material particles 302 forming the porous section 104 to be partially fused. That is, the applied energy may cause the build material particles 302 forming the structures 102 to melt and become fused while being cooled. In addition, the applied energy may cause some of the build material particles 302 forming the porous section 104 to melt and become fused while being cooled. As some of the build material particles 302 forming the porous section 104 may not melt due to the deposition of the detailing agent onto those build material particles 302, those build material particles 302 may not become fully fused with each other. As a result, voids and/or channels may be formed among the build material particles 302 in the porous section 104 through which a fluid may flow through the porous section 104.

Following fabrication of the apparatus 100, a finishing process may be implemented to remove excess build material particles 302 from the apparatus 100. The finishing process may include removal of the excess build material particles 302, e.g., build material particles 302 that may be unintentionally on the apparatus 100 or may be loosely fused to the apparatus 100, through application of pressurized air onto the apparatus 100. For instance, a bead blasting process may be applied on the apparatus 100.

Some or all of the operations set forth in the method 500 may be contained as utilities, programs, or subprograms, in any desired computer accessible medium. In addition, the method 500 may be embodied by computer programs, which may exist in a variety of forms. For example, the method 500 may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method performed by a processor and comprising:
   determining a porosity level of a porous section of a screen apparatus to be fabricated via an additive manufacturing process in which:
   on a layer-by-layer basis, build material is deposited and then one or more print agents are selectively applied onto the build material; and
   energy is applied to the build material to selectively fuse the build material together;
   determining one or more respective patterns at which the one or more print agents are to be selectively applied to the build material to provide controlled thermal bleeding of the build material upon application of the energy such that the build material is partially fused together past where at least one of the one or more print agents are selectively applied to the build material to realize the determined porosity level; and
   causing an additive manufacturing apparatus to additively manufacture the screen apparatus via the additive manufacturing process using the determined one or more respective patterns during the selective application of the one or more print agents.

2. The method of claim 1, wherein the one or more print agents comprise a fusing agent that is selectively applied to the build material such that the build material is fused together where the fusing agent has been applied,
   and wherein the one or more respective patterns comprise a fusing pattern at which the fusing agent is selectively applied to the build material, such that the build material partially fuses past the fusing pattern to realize the determined porosity level.

3. The method of claim 2, wherein the one or more print agents further comprise a detailing agent that is selectively applied to the build material, and wherein the one or more respective patterns further comprise a detailing pattern at which the detailing agent is selectively applied to the build material, such that the build material partially fuses past the fusing pattern but not into the detailing pattern, to realize the determined porosity level.

4. The method of claim 1, wherein the determined porosity level is such that pores of the porous section are less than 10 microns in size.

5. A non-transitory computer-readable storage medium storing instructions executable by a processor to perform processing comprising:
   determining a porosity level of a porous section of a screen apparatus to be fabricated via an additive manufacturing process in which:
   on a layer-by-layer basis, build material is deposited and then one or more print agents are selectively applied onto the build material; and
   energy is applied to the build material to selectively fuse the build material together;
   determining one or more respective patterns at which the one or more print agents are to be selectively applied to the build material to provide controlled thermal bleeding of the build material upon application of the energy such that the build material is partially fused together past where at least one of the one or more print agents are selectively applied to the build material to realize the determined porosity level; and
   causing an additive manufacturing apparatus to additively manufacture the screen apparatus via the additive manufacturing process using the determined one or more respective patterns during the selective application of the one or more print agents.

6. The non-transitory computer-readable storage medium of claim 5,
   wherein the one or more print agents comprise a fusing agent that is selectively applied to the build material such that the build material is fused together where the fusing agent has been applied,
   and wherein the one or more respective patterns comprise a fusing pattern at which the fusing agent is selectively applied to the build material, such that the build material partially fuses past the fusing pattern to realize the determined porosity level.

7. The non-transitory computer-readable storage medium of claim 6, wherein the one or more print agents further comprise a detailing agent that is selectively applied to the build material, and wherein the one or more respective patterns further comprise a detailing pattern at which the detailing agent is selectively applied to the build material, such that the build material partially fuses past the fusing pattern but not into the detailing pattern, to realize the determined porosity level.

8. The non-transitory computer-readable storage medium of claim 5, wherein the determined porosity level is such that pores of the porous section are less than 10 microns in size.

9. A system comprising:
   a processor; and
   a memory storing instructions executable by the processor to perform processing comprising:
   determining a porosity level of a porous section of a screen apparatus to be fabricated via an additive manufacturing process in which:
   on a layer-by-layer basis, build material is deposited and then one or more print agents are selectively applied onto the build material; and
   energy is applied to the build material to selectively fuse the build material together;
   determining one or more respective patterns at which the one or more print agents are to be selectively applied to the build material to provide controlled thermal bleeding of the build material upon application of the energy such that the build material is partially fused together past where at least one of the one or more print agents are selectively applied to the build material to realize the determined porosity level; and
   causing an additive manufacturing apparatus to additively manufacture the screen apparatus via the additive manufacturing process using the determined one or more respective patterns during the selective application of the one or more print agents.

10. The system of claim 9, wherein the one or more print agents comprise a fusing agent that is selectively applied to the build material such that the build material is fused together where the fusing agent has been applied,
    and wherein the one or more respective patterns comprise a fusing pattern at which the fusing agent is selectively applied to the build material, such that the build material partially fuses past the fusing pattern to realize the determined porosity level.

11. The system of claim 10, wherein the one or more print agents further comprise a detailing agent that is selectively applied to the build material, and wherein the one or more respective patterns further comprise a detailing pattern at which the detailing agent is selectively applied to the build material, such that the build material partially fuses past the fusing pattern but not into the detailing pattern, to realize the determined porosity level.

12. The system of claim 9, wherein the determined porosity level is such that pores of the porous section are less than 10 microns in size.

\* \* \* \* \*